(12) United States Patent
Ouchi

(10) Patent No.: US 6,237,736 B1
(45) Date of Patent: May 29, 2001

(54) ONE-WAY CLUTCH BUILT-IN TYPE PULLEY APPARATUS FOR ALTERNATOR AND METHOD FOR PREVENTING SQUEAL OF ENDLESS BELT FOR DRIVING ALTERNATOR

(75) Inventor: Hideo Ouchi, Kanagawa-ken (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 09/504,844

(22) Filed: Feb. 16, 2000

(30) Foreign Application Priority Data

Feb. 23, 1999 (JP) ................................. 11-044266

(51) Int. Cl.$^7$ ............................. F16D 41/06; F16H 55/36
(52) U.S. Cl. ......................................... 192/41 R; 474/70
(58) Field of Search ............................. 192/41 R, 45, 192/45.1; 474/70, 74; 310/100; 123/192.1, 198 R

(56) References Cited

U.S. PATENT DOCUMENTS

| | | |
|---|---|---|
| 1,285,702 | 11/1918 | Hensley . |
| 1,375,576 | 4/1921 | Duca . |
| 1,639,974 | 8/1927 | Andrade, Jr. . |
| 2,044,197 | 1/1936 | Barthel ................................. 192/45 |
| 2,065,244 | 12/1936 | Richards ................................ 192/56 |
| 2,815,838 | 12/1957 | Dodge ................................... 192/45 |
| 2,835,364 | 5/1958 | Picard ................................... 192/45 |
| 3,194,368 | 7/1965 | Benson et al. ......................... 192/45 |
| 3,545,581 | 12/1970 | Kent .................................. 192/45.1 |
| 3,550,737 | 12/1970 | Kent .................................. 192/45.1 |
| 3,623,581 | 11/1971 | Livezey ................................. 192/45 |
| 3,978,950 | 9/1976 | Timtner ............................. 192/41 A |
| 4,725,259 | 2/1988 | Miyata ................................. 474/70 |
| 4,735,599 | 4/1988 | Leonard .............................. 474/101 |
| 4,986,140 | 1/1991 | Morishita et al. ..................... 74/7 C |
| 5,035,309 | 7/1991 | Takada ................................. 192/45 |
| 5,096,035 | 3/1992 | Bradfield .......................... 192/104 B |
| 5,139,463 | 8/1992 | Byztek et al. ......................... 474/69 |
| 5,156,573 | 10/1992 | Byztek et al. ......................... 474/74 |
| 5,211,274 | 5/1993 | Milano, Jr. et al. ................... 192/45 |
| 5,215,174 | 6/1993 | Heidenreich ....................... 192/45.1 |
| 5,279,400 | 1/1994 | Riggle et al. ......................... 192/45 |
| 5,383,542 | 1/1995 | Stockton ........................... 192/45.1 |
| 5,485,905 | 1/1996 | Rader, III ............................. 192/64 |
| 5,517,957 | 5/1996 | Wagner et al. .................... 123/192.1 |

(List continued on next page.)

FOREIGN PATENT DOCUMENTS

| | | |
|---|---|---|
| 2 726 059 | 4/1996 | (FR) . |
| 726575 | 3/1955 | (GB) . |
| 56-101353 | 8/1981 | (JP) . |
| 58-179866 | 12/1983 | (JP) . |
| 59-155346 | 10/1984 | (JP) . |
| 63-176830 | 7/1988 | (JP) . |
| 7-139550 | 5/1995 | (JP) . |
| 7-72585 | 8/1995 | (JP) . |
| 7-317807 | 12/1995 | (JP) . |
| 8-61443 | 3/1996 | (JP) . |
| 8-226462 | 9/1996 | (JP) . |
| 10-281261 | 10/1998 | (JP) . |
| 10-285873 | 10/1998 | (JP) . |

Primary Examiner—Richard M. Lorence
(74) Attorney, Agent, or Firm—Evenson, McKeown, Edwards & Lenahan, P.L.L.C.

(57) ABSTRACT

As a driven pulley for driving the rotary shaft of an alternator, a one-way clutch built-in type pulley is used. The fluctuation range of the angular velocity per rotation of the rotary shaft is set to be less than a half of the fluctuation range of the angular velocity per rotation of the driven pulley by setting restriction to the relation between the inertial moment with respect to this rotary shaft and the resistance against rotation of the rotary shaft, thereby suppressing a noise called squeal without enlarging a driving portion of an alternator or deteriorating the efficiency in electric power generation.

2 Claims, 9 Drawing Sheets

U.S. PATENT DOCUMENTS

| | | | |
|---|---|---|---|
| 5,595,272 | 1/1997 | Zhou | 192/45 |
| 5,598,913 | 2/1997 | Monahan et al. | 192/41 S |
| 5,617,937 | 4/1997 | Zettner et al. | 192/45 |
| 5,638,931 | 6/1997 | Kerr | 192/45 |
| 5,664,653 | 9/1997 | Kurita et al. | 192/45.1 |
| 5,665,018 | 9/1997 | Miyata | 474/74 |
| 5,675,202 | 10/1997 | Zenmei et al. | 310/100 |
| 5,676,225 | 10/1997 | Miyata | 192/41 R |
| 5,695,031 | 12/1997 | Kurita | 192/45 |
| 5,740,893 | 4/1998 | Yamamoto | 192/45 |
| 5,879,254 | 3/1999 | Tanaka | 474/74 |
| 5,908,094 | 6/1999 | Le-Calve | 192/41 R |
| 5,996,753 * | 12/1999 | Temme et al. | 192/45 |
| 6,024,196 | 2/2000 | Miyata | 192/41 R |
| 6,044,943 | 4/2000 | Bytzek et al. | 192/41 R |
| 6,095,301 * | 8/2000 | Fujiwara et al. | 192/45 |

* cited by examiner

TIME (t)

TIME (t)

ONE-WAY CLUTCH BUILT-IN TYPE PULLEY APPARATUS FOR ALTERNATOR AND METHOD FOR PREVENTING SQUEAL OF ENDLESS BELT FOR DRIVING ALTERNATOR

This application claims the benefit of Japanese Patent Application No. 11-044266 which is hereby incorporated by reference.

BACKGROUND OF THE INVENTION

1. Field of the Invention

The present invention relates to a one-way clutch built-in type pulley apparatus for an alternator to be used in an automobile and a method for preventing an audible and annoying squeal of an endless belt for the alternator.

A one-way clutch built-in type driven pulley apparatus for an alternator and a method for preventing squeal of an endless belt for driving the alternator to be provided by the present invention is used for preventing a noise called squeal from occurring in an engagement portion between an endless belt for driving an alternator serving as the power generator of a car and a pulley on which this belt is wound.

2. Related Background Art

The structure of an alternator for generating an electric power necessary for a car by use of a running engine of the car serving as the driving source thereof as disclosed in, for example, Japanese Patent Laid-Open No. 7-139550. FIG. 8 shows the alternator 1 disclosed in this Laid-Open gazette. In the alternator 1, a rotary shaft 3 is rotatably supported by a pair of rolling bearings 4, 4 inside the housing 2. In a middle part of this rotary shaft 3, there are provided a rotor 5 and a commutator 6. Also, a driven pulley 7 is fixed to a portion projecting outward from the housing 2 at one end portion (the right end portion in FIG. 8) of this rotary shaft 3. In the state in which it is assembled in the engine, an endless belt is passed over or wrapped around from this driven pulley 7 to a driving pulley (not shown) which is fixed to an end portion of a crank shaft of the engine so as to allow rotation and driving of the rotary shaft 3.

Hitherto, as this pulley 7, a pulley which is simply fixed to the rotary shaft 3 is generally used. However, a variety of kinds of a one-way clutch built-in type driven pulley apparatus for an alternator are proposed recently, which allow transmission of the drive force from the endless belt to the rotary shaft when a running speed of the endless belt is fixed or shows an upward tendency, while allowing a relative rotation between the driven pulley and the rotary shaft when the running speed of the endless belt shows a downward tendency. Some of such pulley apparatuses are already used in practice. For example, a several kinds of such one-way clutch built-in type driven pulley apparatus for an alternator having a function as mentioned above are disclosed in Japanese Patent Laid-Open Nos. 56-101353, 7-317807, 8-61443, and 8-226462, and Patent Publication No. 7-72585, French Patent Publication No. FR2726059A1, etc.

Out of them, FIG. 9 shows the one-way clutch built-in type driven pulley apparatus for an alternator disclosed in Japanese Patent Laid-Open No. 8-226462. This one-way clutch built-in type driven pulley apparatus for an alternator has a sleeve 8 which is fitted on and fixed to the rotary shaft 3 of the alternator 1. Around this sleeve 8, a driven pulley 7a is provided concentrically with this sleeve 8. On the outer peripheral surface of this driven pulley 7a, there are formed a plurality of grooves 9, 9 (five in FIG. 9) each having V-shaped cross section and extending along the entire circumference in parallel to each other. An endless belt which is a V-ribbed belt for a car by Japanese Automobile Standards Organization (JASO) standard and has a plurality of ribs each having a V-shaped cross section and extending along the entire circumference on the inner peripheral surface thereof is passed over between such driven sleeve 7a and the unrepresented driving pulley. In this state, the ribs formed on the inner peripheral surface of this endless belt and the grooves 9, 9 are brought into a meshing state in a wedge-shaped manner, respectively, so that a surface pressure of a contact portion between the ribs and the grooves 9, 9 is securely fixed, whereby a large drive force (tractive force) can be transmitted between the endless belt and the driven pulley 7a.

A pair of support bearings 10, 10 and a roller clutch 11 are provided between the outer peripheral surface of the sleeve 8 and the inner peripheral surface of the driven pulley 7a. Out of them, the support bearings 10, 10 allow a relative rotation between the sleeve 8 and the driven pulley 7a, while supporting a radial load which is applied on the driven pulley 7a. The roller clutch 11 allows transmission of the rotating force from this driven pulley 7a to the sleeve 8 only when the driven pulley 7a is inclined to rotate relatively to the sleeve 8 in a given direction.

On the outer peripheral surface of the middle part of an inner race 12 which constitutes the roller clutch 11 and is fitted on and fixed to the sleeve 8, a plurality of recesses 13, 13 collectively called a ramp portion are formed at regular intervals in the circumferential direction, thereby making the outer peripheral surface of the middle part a cam surface 14. The outer peripheral surfaces of the both ends of the inner race 12 serve as inner race-ways 15, 15 for the support bearings 10, 10. On the other hand, the inner peripheral surface of the outer race 16 which constitutes the roller clutch 11 and is fitted in and fixed to the driven pulley 7a is formed as a simple cylindrical surface substantially over the entire length thereof. A plurality of rollers 17, 17 for constituting the roller clutch 11, together with the inner race 12 and an outer race 16, are supported by a clutch retainer 18 to be capable of rolling and displacing to some extent in the circumferential direction. Then, there is provided a spring between a column portion arranged in this clutch retainer 18 and each of the rollers 17, 17 so that the rollers 17, 17 are elastically pressed in the same direction with respect to the circumferential direction. Note that the structure and the function of the roller clutch 11 are conventionally known so that detailed illustration and description thereof will be omitted.

A roller clutch built-in type driven pulley apparatus for an alternator as mentioned above is conventionally installed onto the rotary shaft 3 of the alternator 1 (FIG. 8) for the following reason. That is, if, for example, the driving engine is a diesel engine, the angular velocity of rotation of the crank shaft fluctuates largely (for example, a rate of fluctuation becomes 20% or around) at the time of idling or low speed rotation. As a result, the running speed of the unrepresented endless belt which is wrapped over the driving pulley fixed to the end portion of the crank shaft also fluctuates finely. On the other hand, the rotary shaft 3 of the alternator 1 which is driven to rotate by this endless belt through the driven pulley 7a does not fluctuate so drastically owing to the inertial masses of this rotary shaft 3 and the rotor 5, the commutator 6 (FIG. 8) and the like fixed to this rotary shaft 3. Accordingly, when the driven pulley 7a is simply fixed with respect to the rotary shaft 3, the endless belt and the driven pulley 7a are inclined to rub against each other in the both directions upon a fluctuation in angular velocity of rotation of the crank shaft. As a result, stress in the different directions acts repeatedly on the endless belt which rubs against this driven pulley 7a, so as to cause easy slippage between this endless belt and the driven pulley 7a, or a deteriorated durability of the endless belt.

Deterioration of the durability of the endless belt based on the friction between the outer peripheral surface of the driven pulley 7a and the inner peripheral surface of the endless belt as described above is also caused by repeated acceleration and deceleration at running time. That is, the driving force is transmitted from the endless belt side to the driven pulley 7a side at acceleration, while the braking force is operated from the endless belt on the driven pulley 7a which tends to continuously rotate based on inertia, as described above, at deceleration. The braking force and the driving force respectively act as frictional forces in the opposite directions with respect to the inner peripheral surface of the endless belt, which also causes deterioration of the durability of the endless belt. Particularly, in case of a vehicle which is equipped with an exhaust brake such as a motor truck, deceleration of rotation of the crank shaft is conspicuous when the accelerator is off and the frictional force applied on the inner peripheral surface of the endless belt becomes large owing to the braking force. As a result, the durability of the endless belt is conspicuously deteriorated.

Then, by the use of the above-mentioned one-way clutch built-in type driven pulley apparatus for an alternator as the driven pulley 7a, it is arranged such that the rotating force is transmitted from the driven pulley 7a to the rotary shaft 3 when the running speed of the endless belt is fixed or has an upward tendency, while the driven pulley 7a and the rotary shaft 3 are rotated relative to each other when the running speed of the endless belt has a downward tendency. That is, when the running speed of the endless belt has a downward tendency, the angular velocity of rotation of the driven pulley 7a is set to be slower than that of the rotary shaft 3, thereby preventing the endless belt and the driven pulley 7a from rubbing against each other strongly at a contact portion therebetween. With such arrangement, the direction of a stress acting on the part at which the driven pulley 7a and the endless belt rub against each other is fixed so as to prevent slippage between this endless belt and the driven pulley 7a or deterioration of the durability of the endless belt.

As described above, the one-way clutch built-in type pulley apparatus is conventionally assembled in a driven pulley attached to an alternator, only aiming of prolonging the life of an endless belt which is used for driving. On the other hand, it is conventionally known that in such endless belt for driving the alternator a sound offensive to the ear called squeal is often generated owing to sliding friction at a contact portion between the belt and the driven pulley. In order to prevent such squeal, it is conventionally arranged that the diameter of the driven pulley is enlarged or the number of grooves on the outer peripheral surface of this driven pulley and the number of ribs on the inner peripheral surface of the endless belt are increased.

However, there is a limit to enlargement of the diameter of the driven pulley or increase of the number of the grooves or the ribs in terms of a space for installation. Moreover, if the diameter of the driven pulley is enlarged, the speed of rotation of the rotor of the alternator declines, so as to decrease the efficiency in power generation or cause other problems.

SUMMARY OF THE INVENTION

The one-way clutch built-in type pulley apparatus for an alternator and the method for preventing squeal of an endless belt for driving the alternator according to the present invention have been devised taking these problems into consideration.

In accordance with the one-way clutch built-in type pulley apparatus for an alternator and the method for preventing squeal of an endless belt for driving the alternator of the present invention, such one-way clutch built-in type pulley apparatus for an alternator is used which, like the conventional one-way clutch built-in type pulley apparatus for an alternator shown in FIG. 9 above, comprises:

a rotary shaft for constituting the alternator to rotate with a rotor of this alternator;

a driven pulley disposed around the rotary shaft concentrically with this rotary shaft;

a one-way clutch disposed between a middle part in the axial direction of the outer peripheral surface of the rotary shaft and a middle part in the axial direction of the inner peripheral surface of the driven pulley to transmit a rotating force between the driven pulley and the rotary shaft only when this driven pulley is inclined to relatively rotate in a given direction with respect to the rotary shaft; and a pair of support bearings disposed between the outer peripheral surface of the rotary shaft and the inner peripheral surface of the driven pulley in the manner of sandwiching this one-way clutch therebetween from the both sides in the axial direction to allow a relative rotation between the rotary shaft and the driven pulley while pivotally supporting a radial load applied on this driven pulley.

Especially, in accordance with the one-way clutch built-in type pulley apparatus for an alternator and the method for preventing squeal of an endless belt for driving the alternator of the present invention, such one-way clutch built-in type pulley apparatus for an alternator as described above is used in a state in which the range of fluctuation in angular velocity of rotation per rotation of the rotary shaft is less than a half (preferably a third, and more preferably a fourth) the range of fluctuation in angular velocity of rotation per rotation of the driven pulley when the engine is in an idling state and a current load of the alternator is at its maximum.

In accordance with the one-way built-in type pulley apparatus for an alternator and the method for preventing squeal of the endless belt for driving the alternator of the present invention constituted as described above, it is possible to prevent squeal which is generated owing to the sliding frictional engagement between the endless belt and the driven belt without particularly enlarging the diameter of the driven pulley or increasing the number of the grooves or the ribs.

Next, description will be made on a reason why the squeal can be prevented by making the range of fluctuation in angular velocity of rotation per rotation of the rotary shaft of the alternator to be less than a half the range of fluctuation in angular velocity of rotation per rotation of the driven pulley.

First, description will be made on experiments conducted by the present inventors in order to find conditions for generating the squeal with reference to FIG. 1. A load of the alternator in which the driven pulley 7 is assembled is denoted by P [PS or horsepower]. In this case, the load also includes an inertial load of this alternator. That is, since being driven to rotate based on intermittent explosions inside the engine cylinder, a crank shaft of the engine for driving this alternator does not effect perfectly smooth rotational movement, so that an angular velocity slightly fluctuates. When the angular velocity is once decelerated and then accelerated, the inertial mass of a rotating portion of the alternator becomes a load to affect a frictional engagement portion between the driven pulley 7 and the endless belt 19. The larger the load to be transmitted in this frictional engagement portion becomes, the more easily the noise called squeal tends to occur. Then, as the load P [PS or horsepower] of the alternator, not only a load based on a resistance against the rotation of the rotary shaft 3 (FIG. 8) including a force acting between the rotor 5 and a stator, but the above-mentioned inertial load is additionally employed.

Also, it is arranged such that the diameter of the pitch circle of the driven pulley 7 is denoted by D [mm], the speed of rotation of the rotary shaft which rotates together with this driven pulley 7 is denoted by n [r.p.m.], a wrapping angle of the endless belt 19 with respect to the driven pulley 7 is denoted by $\theta[°]$, and the number of ribs (projections each having a V-shaped cross section extending along the entire circumference) formed on the inner peripheral surface of this endless belt is denoted by N. Further, the tension on the tension side (the side on which the belt is pulled by the unrepresented driving pulley) of this endless belt 19 is denoted by F1 [kgf], while the tension on the loose side (the side on which the belt is fed by the unrepresented driving pulley) is denoted by F2 [kgf]. Since 1 [PS or horsepower] equals to 75 [kgf·m/s], the following Expression (1) is established:

$$(F1-F2) \cdot \pi \cdot D \times 10^{-3} \cdot (n/60) = 75P \tag{1}$$

Then, from this Expression (1) the following Expression (2) is deduced:

$$F1-F2 = (60 \times 75 \times 10^3/\pi) \cdot \{P/(D \cdot n)\} \tag{2}$$

Also, from the wrapping angle $\theta[°]$ mentioned above, the contact length L [m] in the pitch circle portion between the driven pulley 7 and the endless belt 19 can be obtained from the following Expression (3):

$$L = (D/2) \cdot (\pi/180) \cdot \theta \times 10^{-3} \tag{3}$$

Accordingly, the tractive force T[kgf/m] per unit length for each of the plurality of ribs formed on the inner peripheral surface of the endless belt 19 is represented by the following Expression (4):

$$T = (F1-F2)/(L \cdot N) = (1.6414 \times 10^{11} \cdot P)/(D^2 \cdot n \cdot \theta \cdot N) \tag{4}$$

After carrying out experiments on the relation between the tractive force T [kgf/m] thus obtained and the squeal, the present inventor has obtained the results shown in Table 1 below.

TABLE 1

| Value for T | Judgment |
|---|---|
| 20 | O |
| 40 | O |
| 60 | O |
| 80 | O |
| 100 | X |
| 120 | X |

The driven pulley 7 which is used in the above experiments the results of which are shown in the above Table 1 is of a fixed type having no one-way clutch therein. In the above Table 1 showing the results of the experiments conducted under such condition, the mark O indicates that no squeal is generated, while the mark X indicates that the squeal is generated. As clearly seen from the experimental results shown in the Table 1, if the driven pulley 7 of the fixed type is used and when the tractive force T per unit length for each rib is not less than 100 [kgf/m], squeal is generated.

The present inventor then assembles the one-way clutch built-in type pulley apparatus in the alternator under the condition that the tractive force T per unit length for each rib exceeds 100 [kgf/m], thereby belt-driving this alternator. As a result, the noise called squeal is eliminated or reduced. The present inventor estimates the reason for this as follows.

When the one-way clutch built-in type pulley apparatus is assembled in the alternator for driving to rotate the alternator, it is possible to reduce a difference between the running speed of the endless belt and the speed of rotation of the driven pulley, irrespective of fluctuation in angular velocity of rotation of the crank shaft. That is, the speed of rotation of the driving pulley which is fixed to the crank shaft and the running speed of the endless belt which is wrapped around this driving pulley fluctuate in response to (in synchronism with) a fluctuation in angular velocity of rotation of the crank shaft. On the other hand, a fluctuation in angular velocity of rotation of the rotary shaft of the alternator which is driven to rotate by the one-way clutch built-in type pulley apparatus is less than a fluctuation in angular velocity of rotation of the crank shaft. That is, even when the angular velocity of rotation of this crank shaft and the running speed of the endless belt are reduced, the one-way clutch falls in an overrun state and the rotary shaft of the alternator continues to rotate at the current speed based on the inertial masses of this rotary shaft itself and of a rotor or the like fixed to this rotary shaft. For this reason, when the angular velocity of rotation of the crank shaft and the running speed of the endless belt are increased, a difference between the running speed of the endless belt and the speed of rotation of the rotary shaft is reduced, which results in a reduction of the inertial load of a portion which is rotated and driven together with the driven pulley. Thus, the same effect equal to the reduction of the tractive force T [kgf/m] per unit length for each rib can be achieved.

Accordingly, in case that the tractive force T [kgf/m], per unit length exceeds 100 [kgf/m], if the one-way clutch built-in type pulley apparatus is attached as a driven pulley to be attached to the rotary shaft of the alternator, such squeal as mentioned above can be suppressed to some extent (at least the duration of the squeal can be reduced). However, it is not possible to obtain the effect of preventing squeal at its maximum only by attaching the one-way clutch built-in pulley apparatus to the rotary shaft. More specifically, the squeal in the alternator is caused by sliding friction between the outer peripheral surface of the driven pulley and the inner peripheral surface of the endless belt. This sliding friction is caused upon a fluctuation in running speed of this endless belt. As a result, it is effective for preventing the squeal to rotate the driven pulley with a light force (i.e., to make the torque required for rotating this driven pulley small) when the running speed of this endless belt varies most largely. As in the present invention, if the fluctuation range of the angular velocity of rotation of the rotary shaft is set to be less than a half of the fluctuation range of the angular velocity of rotation of the driven pulley, that is, the fluctuation range of the running speed of the endless belt, the driven pulley can be arranged to rotate with a light force when the running speed of the endless belt varies most largely. This mechanism will be described more specifically with reference to FIG. 2 to FIG. 5.

Note that the torque for driving the rotary shaft of the alternator becomes larger in accordance with an electric current load. An amount of power generation corresponding to this electric current load is substantially proportional to the speed of rotation of the rotary shaft. As a result, the torque for driving this rotary shaft becomes its maximum in the idling state in which the electric current load is largest and the speed of rotation of the driving engine is lowest. Moreover, a fluctuation in speed of rotation of the engine becomes largest in the idling state. Accordingly, the noise called squeal is generated most easily when the engine is in the idling state and the current load of the alternator is at its maximum, which is the limiting condition in the claims.

In any case, the angular velocity of rotation of the driven pulley which is driven to rotate by the endless belt passed over between the driven pulley and the driving pulley fixed to the crank shaft of the engine fluctuates substantially in response to a fluctuation in angular velocity of rotation of the crank shaft, as shown in FIG. 2A. The angular velocity of rotation of the driven pulley is divided into an average angular velocity component shown in FIG. 2B and a fluctuating angular velocity component shown in FIG. 2C. A driving force based on the average angular velocity component, out of them, is to be consumed for rotating the rotary shaft, against the electric current load of the alternator, the rolling resistance of the rolling bearings for supporting the rotary shaft of this alternator, the resistance of seal rings for sealing, etc., so that this driving force does not directly cause the sliding friction leading to the squeal as long as the belt drive system is designed properly. On the other hand, the fluctuating angular velocity component is not to be consumed for driving to rotate the rotary shaft as it is, so as to directly cause the sliding friction leading the squeal. Then, description will be made on a reason for preventing the squeal from being generated, irrespective of presence of the fluctuating angular velocity component, by use of the one-way clutch built-in type pulley apparatus as the driven pulley.

When the driven pulley is fixed to the rotary shaft of the alternator, the angular velocity of this rotary shaft fluctuates as shown in FIG. 3A. The graph shown in FIG. 3A can be substantially approximated by the following Expression:

$$\omega = \delta \cdot \sin(Bt) \quad (1).$$

Note that a curve indicating an actual fluctuation in angular velocity has a little distorted form for a sine wave. However, this distortion is to the extent that the following description can be satisfactorily established.

When the inertial moment with respect to the rotary shaft is I and the angular velocity of this rotary shaft is $\omega$, the torque which is generated from the force of inertia, out of the torque for driving the alternator, is represented by the following expression (2) due to Newton's law:

$$I \cdot (d\omega/dt) \quad (2).$$

From this Expression (2) and the Expression (1), the driving torque of the alternator generated from the force of inertia is obtained from the following Expression (3):

$$I \cdot (d\omega/dt) = I \cdot \delta \cdot B \cdot \cos(Bt) \quad (3).$$

This driving torque is shown in FIG. 3B.

The graph in FIG. 3B which shows a fluctuation in driving torque of the alternator generated from the above force of inertia is, as clearly seen by comparison with the curve shown in FIG. 3A, has a phase which is shifted by 90 degrees from the curve indicating the degree of the angular velocity. Encircled points on the curves respectively shown in FIGS. 3A and 3B, that is, the points at which the degree of increase of this angular velocity (a differentiated value of the angular velocity=the degree of angular acceleration) becomes largest in the middle of increase of the angular velocity and the points at which the driving torque of the alternator which is generated from the force of inertial becomes largest, are points at which the squeal is generated most easily.

Next, description will be made on a case in which the driven pulley to be installed on the rotary shaft of the alternator is a one-way clutch built-in type pulley apparatus. When this driven pulley has a one-way clutch therein, if the driven pulley which is rotated in synchronism with the run of the endless belt is decelerated, the one-way clutch falls in an overrun state and the rotary shaft is rotated as it is by inertia. However, the angular velocity of this rotary shaft is declined owing to the current load, the rolling resistance of the rolling bearings, the resistance of the seal rings for sealing, etc., to be equal to the angular velocity of the driven pulley after the lapse of a short period, whereby the one-way clutch is locked for the second time. In this state, the angular velocity of the rotary shaft becomes equal to the angular velocity of the driven pulley. The overrun state and the locked state of the one-way clutch are finely repeated so long that the driven pulley is rotated while varying the angular velocity.

In such a use state, description will be made on a case in which the fluctuation range $\delta_1$ of the angular velocity of rotation of the rotary shaft is not less than a half of the fluctuation range $\delta o$ of the angular velocity of rotation of the driven pulley ($\delta o/2 \leq \delta_1 < \delta o$) with reference to FIGS. 4A and 4B. In this case, the angular velocity of the driven pulley fluctuates as indicated by the broken line in FIG. 4A, while the angular velocity of the rotary shaft fluctuates as indicated by the solid line in FIG. 4B, respectively. At a straight line portion of this solid line, the one-way clutch is in an overrun state. As clearly seen from FIG. 4A, when the fluctuation range $\delta_1$ of the angular velocity of rotation of the rotary shaft is not less than a half of the fluctuation range $\delta o$ of the angular velocity of rotation of the driven pulley, the one-way clutch passes in its locked state the points encircled by the chain lines in FIG. 4A which are equal to the encircled points on the curves in FIGS. 3A and 3B at which angular acceleration of the driven pulley becomes largest.

FIG. 4B shows values obtained by multiplying differentiated values of the angular velocity $\omega$ of the rotary shaft indicated by the solid line in FIG. 4A by the inertial moment I concerning this rotary shaft $\{(I \cdot (d\omega/dt)\}$ for indicating the part of the driving torque of the alternator which is generated owing to the force of inertia. The points corresponding to the encircled points in FIG. 3A remain intact on the curve indicated by the solid line in FIG. 4A. Consequently, the points (encircled by the chain lines in FIG. 4B corresponding to the encircled points on the curves in FIG. 3B at which the driving torque of the alternator generated by the force of inertia becomes largest remain intact on the curve in FIG. 4B which is obtained by differentiating the points indicated by the solid line. As clearly seen from this, when the fluctuation range $\delta_1$ of the angular velocity of rotation of the rotary shaft is not less than a half of the fluctuation range $\delta o$ of the angular velocity of rotation of the driven pulley, it is not possible to decrease the maximum value of the torque which is required for driving the driven pulley even by using the one-way clutch. What is possible is only to suppress a fluctuation in tension of the endless belt to prolong the life of this endless belt, and to shorten the duration of squeal if it is generated by reducing the period of time in which the torque is being large, so as to reduce the degree of offensiveness of the squeal to the ear.

On the other hand, as in the present invention, when the fluctuation range $\delta_1$ of the angular velocity of rotation of the rotary shaft is less than a half the fluctuation range $\delta o$ of the angular velocity of rotation of the driven pulley, it is possible to prevent generation of the squeal itself by decreasing the maximum value of the torque which is required for driving the driven pulley. This mechanism will be described with reference to FIGS. 5A and 5B. Also in this case, the angular velocity of the driven pulley fluctuates as indicated by a broken line in FIG. 5A, while the angular velocity of the rotary shaft fluctuates as indicated by a solid line in the same manner, respectively. As clearly seen from FIG. 5A, when the fluctuation range $\delta_1$ of the angular velocity of rotation of the rotary shaft is less than a half the fluctuation range $\delta o$ of the angular velocity of the driven pulley, the one-way clutch passes the points corresponding to the encircled points on the curve in FIGS. 3A and 3B (the encircled points indicated by a chain line in FIG. 5A), at which the angular acceleration of the driven pulley becomes largest, in an overrun state in which the one-way clutch does not transmit the torque.

FIG. 5B shows values obtained by multiplying differentiated values of the angular velocity $\omega$ of the rotary shaft indicated by the solid line in FIG. 5A by the inertial moment I concerning this rotary shaft $\{(I\cdot(d\omega/dt)\}$ for indicating the part of the driving torque of the alternator which is generated owing to the force of inertia. The points corresponding to the encircled points in FIG. 3A does not exist on the curve indicated by the solid line in FIG. 5A. Consequently, the points (encircled by the chain lines in FIG. 5B corresponding to the encircled points on the curves in FIG. 3B at which the driving torque of the alternator generated by the force of inertia becomes largest does not exist on the curve in FIG. 5B which is obtained by differentiating the points indicated by the solid line. As clearly seen from this, when the fluctuation range $\delta_1$ of the angular velocity of rotation of the rotary shaft is less than a half of the fluctuation range $\delta o$ of the angular velocity of rotation of the driven pulley, it is possible to decrease the maximum value of the torque which is required for driving the driven pulley by use of the one-way clutch.

As described above, in case of the present invention, it is possible to lower the maximum value of the torque required for driving the driven pulley by using the one-way clutch built-in type pulley apparatus as the driven pulley for driving the rotary shaft of the alternator and also by setting the fluctuation range $\delta_1$ of the angular velocity of rotation of the rotary shaft to be less than a half (preferably a third, and more preferably a fourth) of the fluctuation range $\delta o$ of the angular velocity of rotation of the driven pulley. For this reason, it is possible to obtain the same effect as the case in which the tractive force T[kgf/m] per unit length mentioned above is decreased, so as to effectively prevent generation of the squeal even under severe use conditions.

Note that, as clearly seen from the above description, the condition for sufficiently obtaining the function and the effect of the present invention by setting the fluctuation range $\delta_1$ of the angular velocity of rotation of the rotary shaft to be less than a half of the fluctuation range $\delta o$ of the angular velocity of rotation of the driven pulley is that the time required for the reduction in speed of rotation of this rotary shaft is long, namely the inertial moment I of the rotary shaft of the alternator is large, a resistance against a rotation of this rotary shaft is small, and the one-way clutch is in an overrun state. As a result, in order to embody the present invention, an alternator and a one-way clutch built-in type pulley apparatus which satisfy the above condition have to be combined with each other.

DESCRIPTION OF THE PREFERRED EMBODIMENTS

Figure 1:
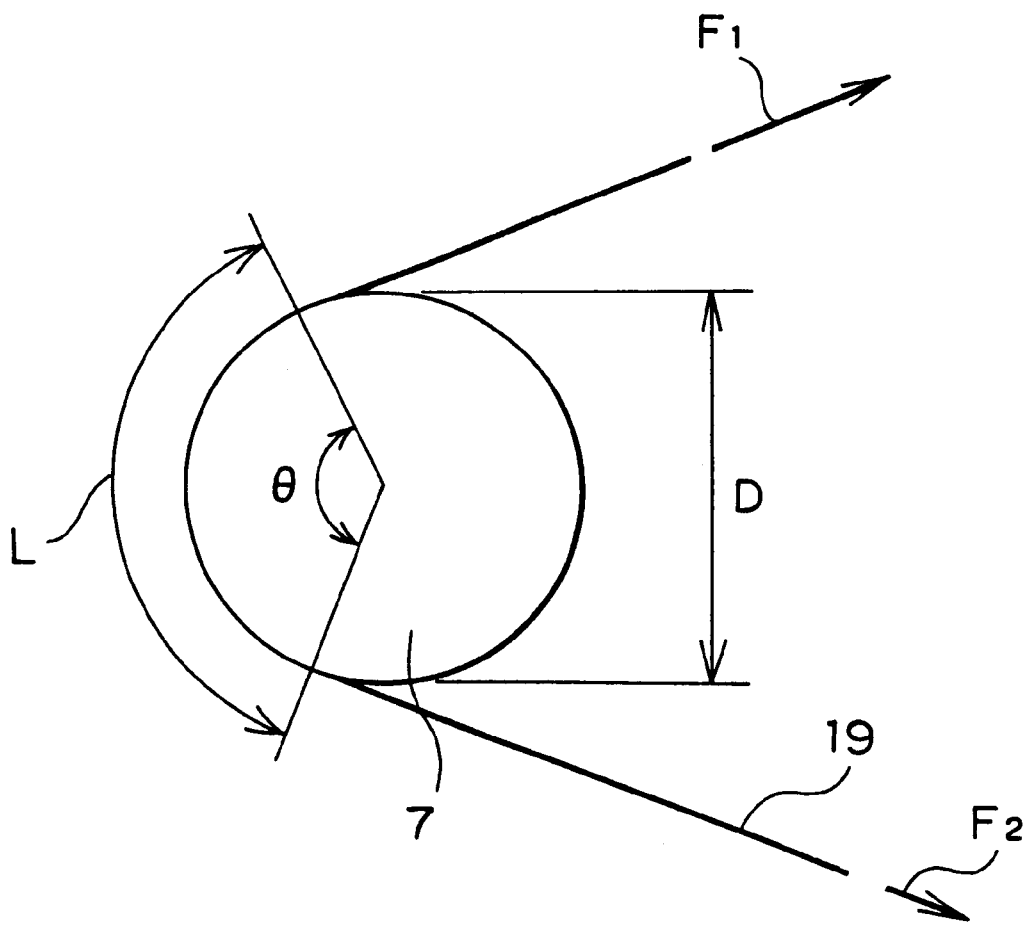
FIG. 1 is a schematic front view for showing a part in which the endless belt is wrapped around the driven pulley, to explain the tractive force generated by the endless belt.
Figure 2A:
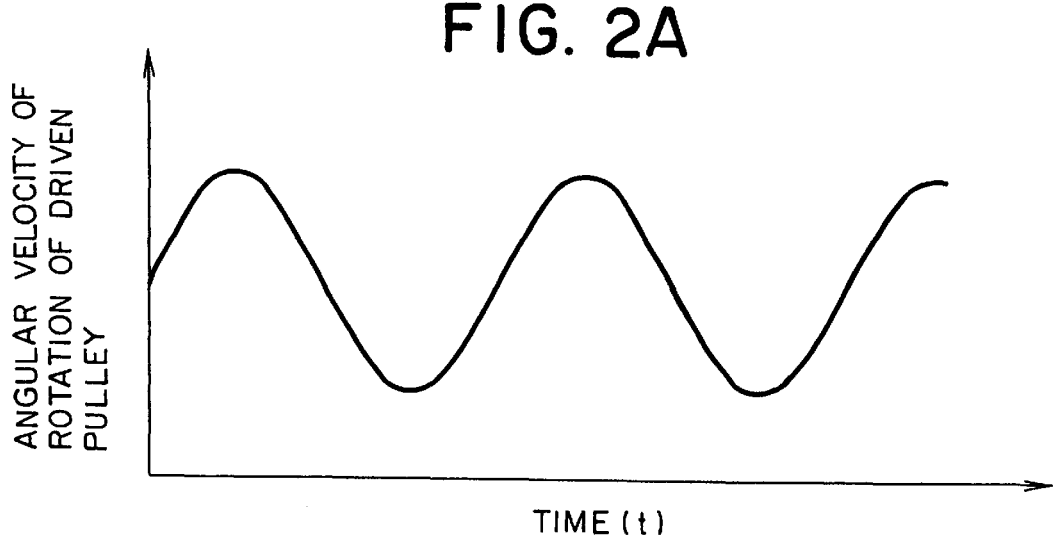
FIGS. 2A to 2C show graphs for explaining a fluctuation in angular velocity of rotation of the driven pulley in accordance with a fluctuation in running speed of the endless belt.
Figure 2B:
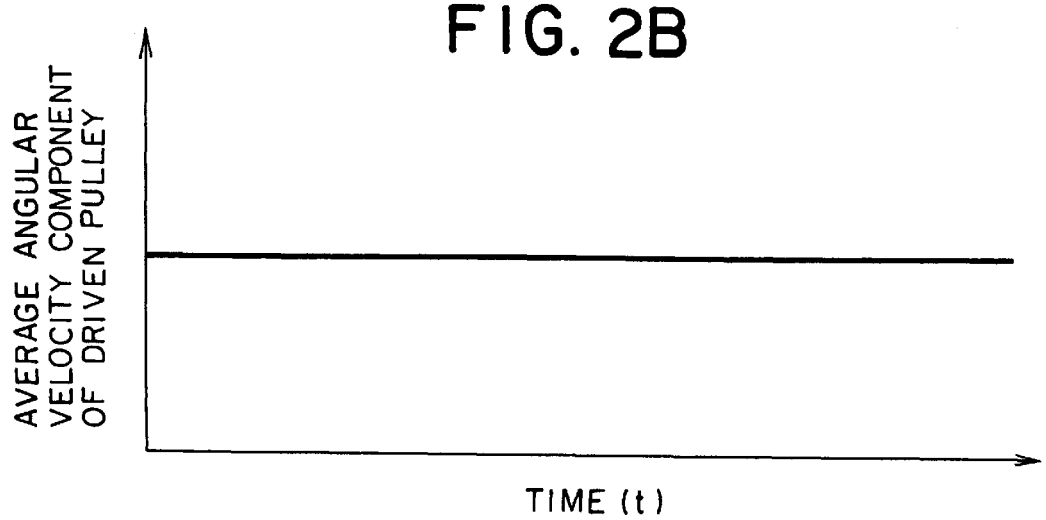
Figure 2C:
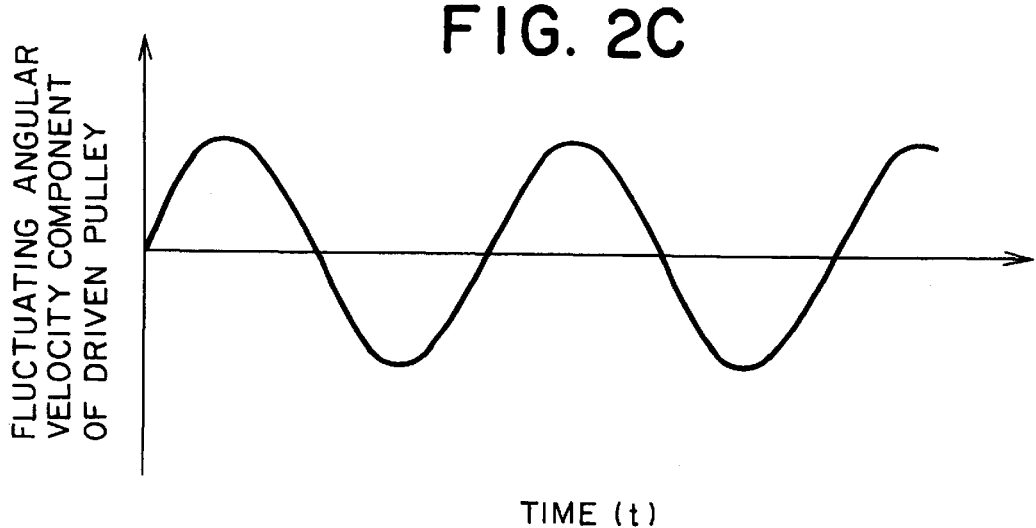
Figure 3A:
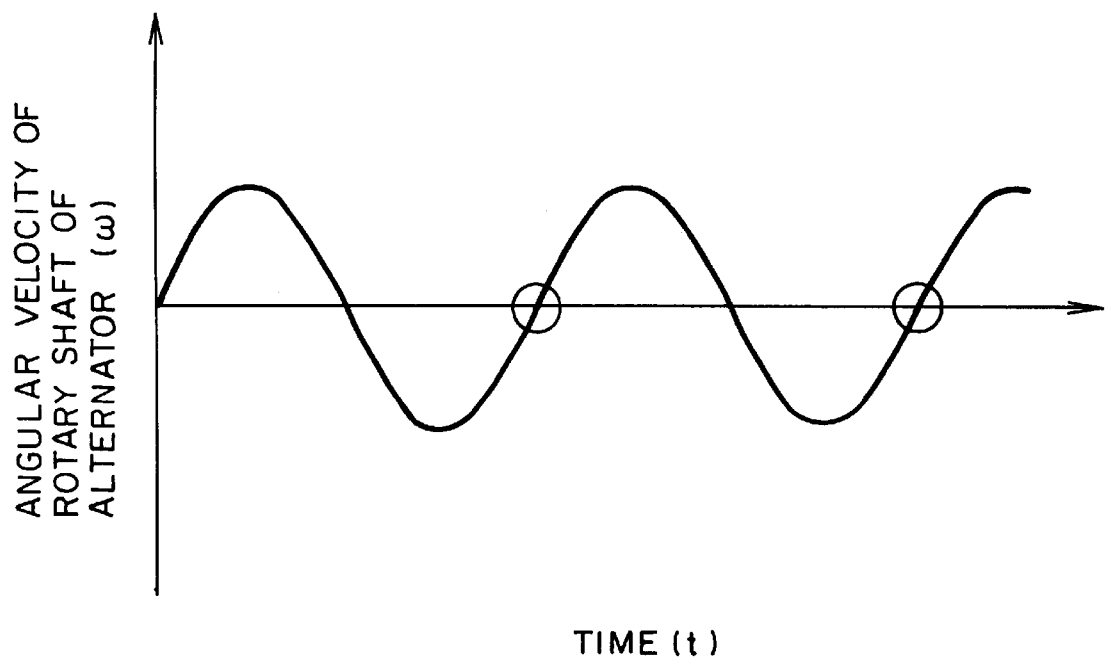
FIGS. 3A and 3B show graphs for explaining a fluctuation component of the angular velocity of rotation of the rotary shaft and a driving torque of the alternator based on inertia when the driven pulley is fixed to the rotary shaft of the alternator.
Figure 3B:
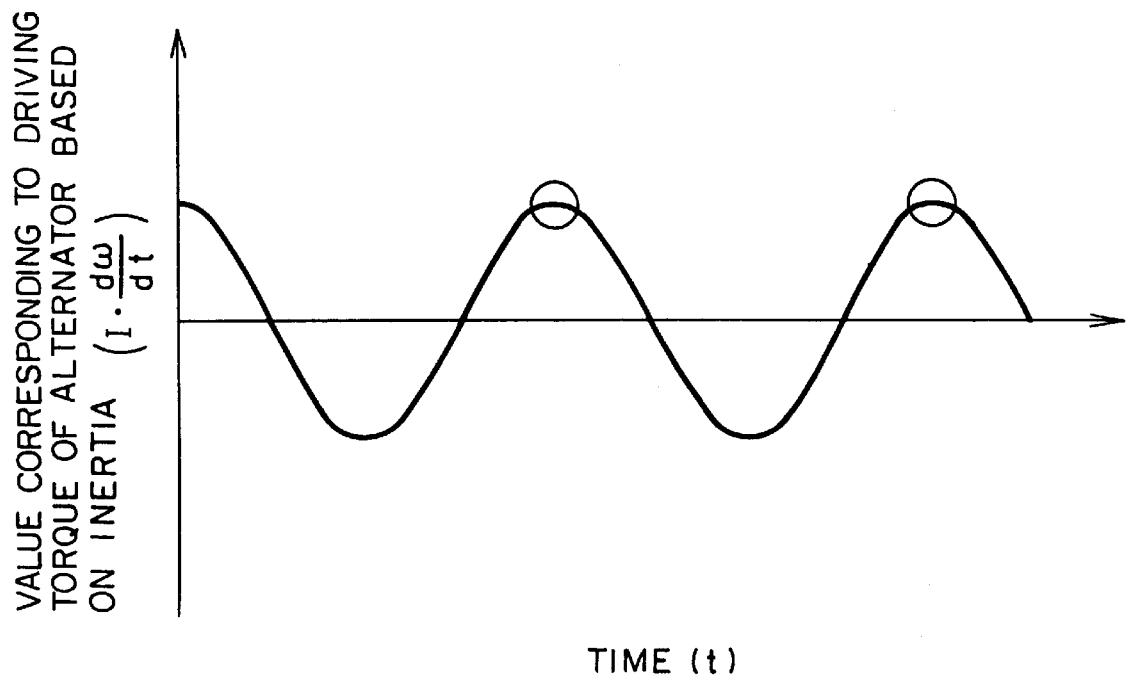
Figure 4A:
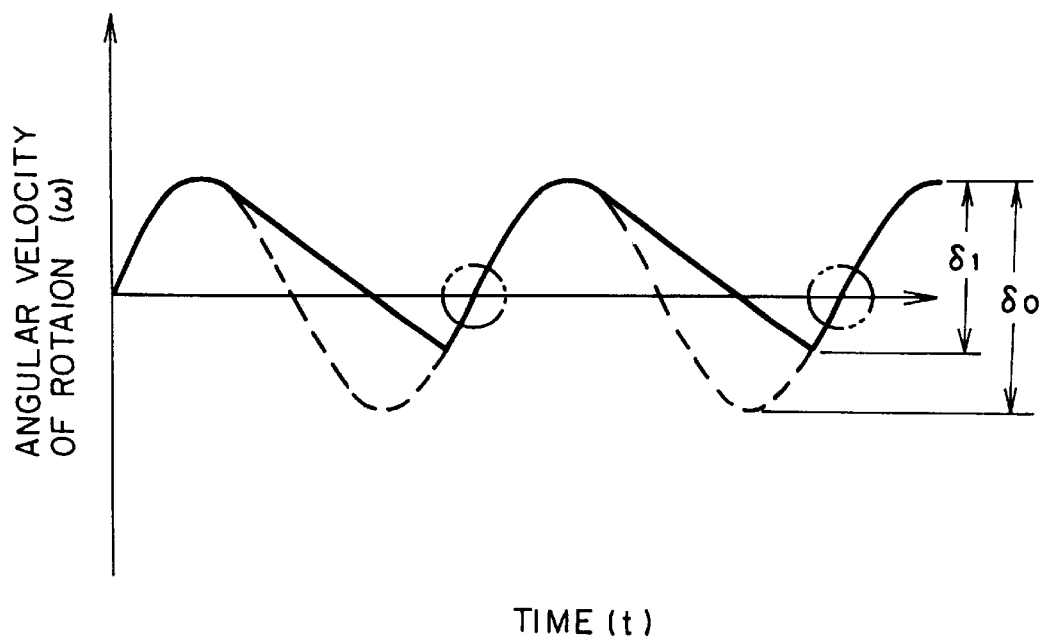
FIGS. 4A and 4B show graphs for explaining a fluctuation component of the angular velocity of rotation of the driven pulley and the driving torque of the alternator based on inertia when the fluctuation range of the angular velocity per rotation of the rotary shaft of the alternator is not less than a half of the fluctuation range of the angular velocity per rotation of the driven pulley.
Figure 4B:
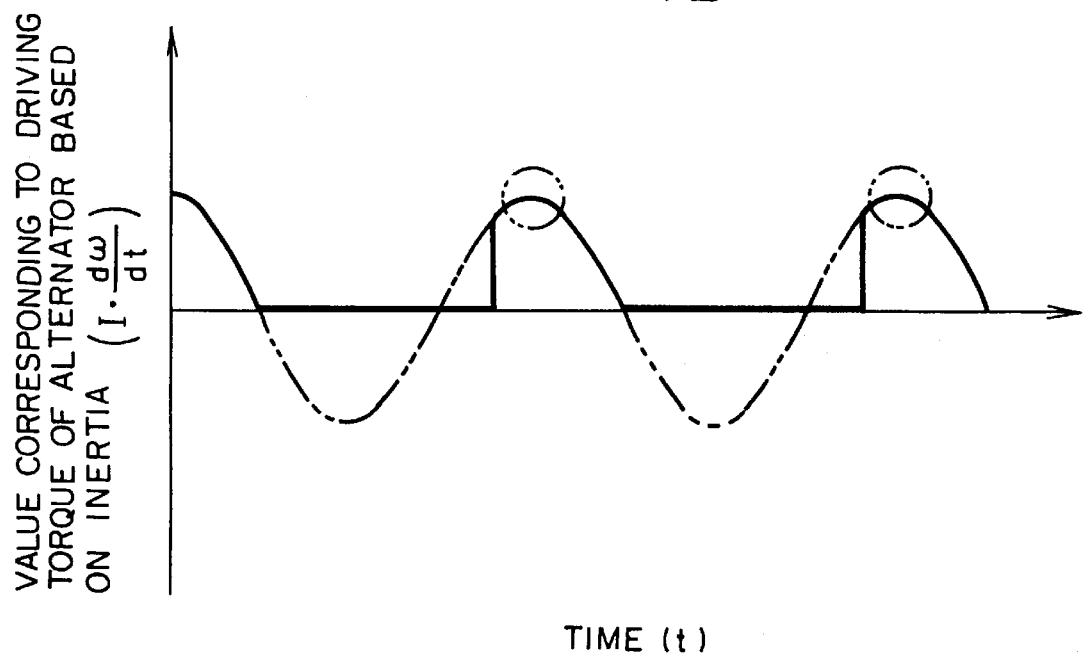
Figure 5A:
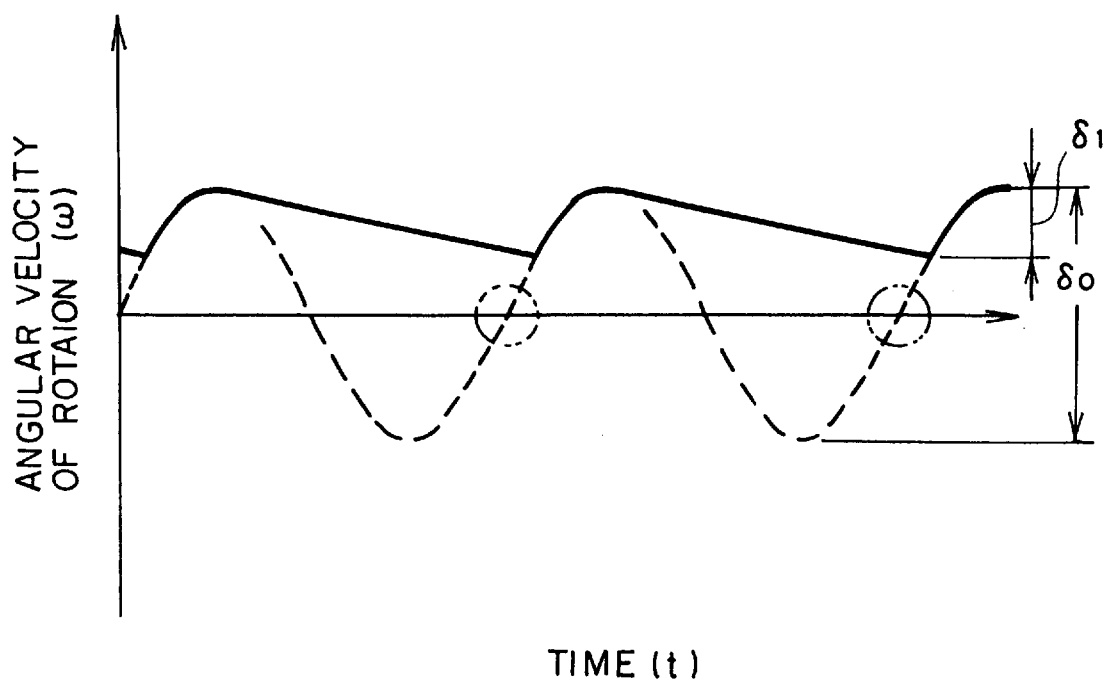
FIGS. 5A and 5B show graphs for explaining a fluctuation component of the angular velocity of rotation of the driven pulley and the driving torque of the alternator based on inertia when the fluctuation range of the angular velocity per rotation of the rotary shaft of the alternator is less than a half of the fluctuation range of the angular velocity per rotation of the driven pulley.
Figure 5B:
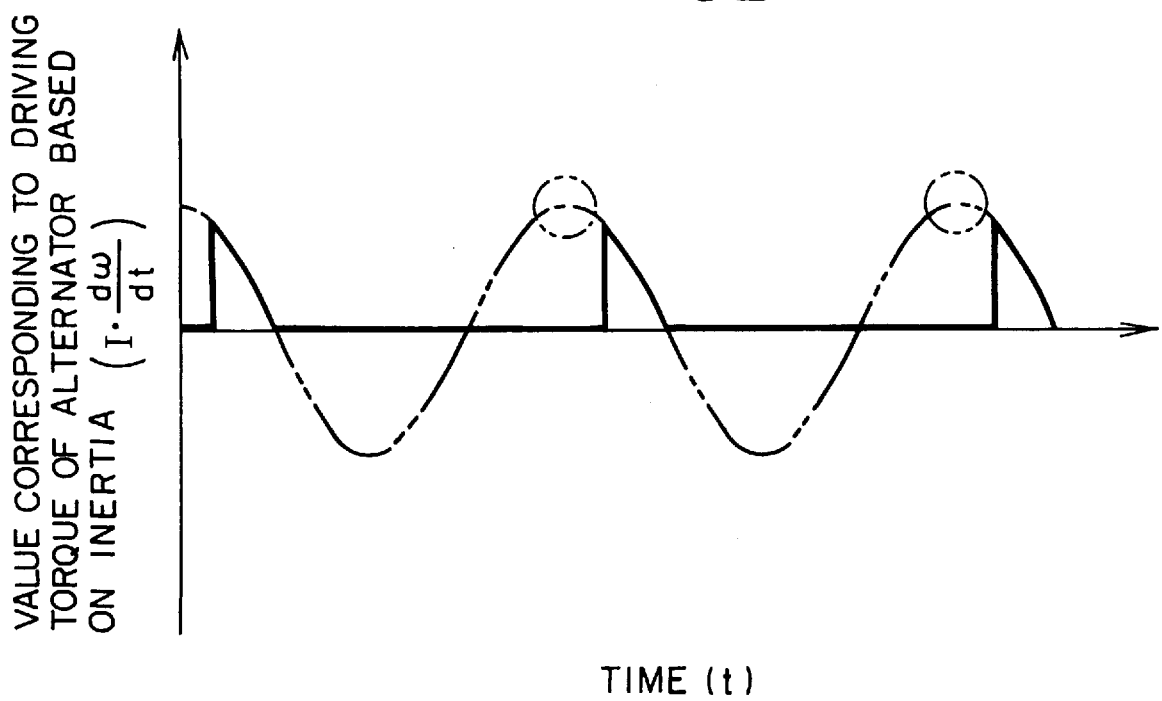
Figure 6:
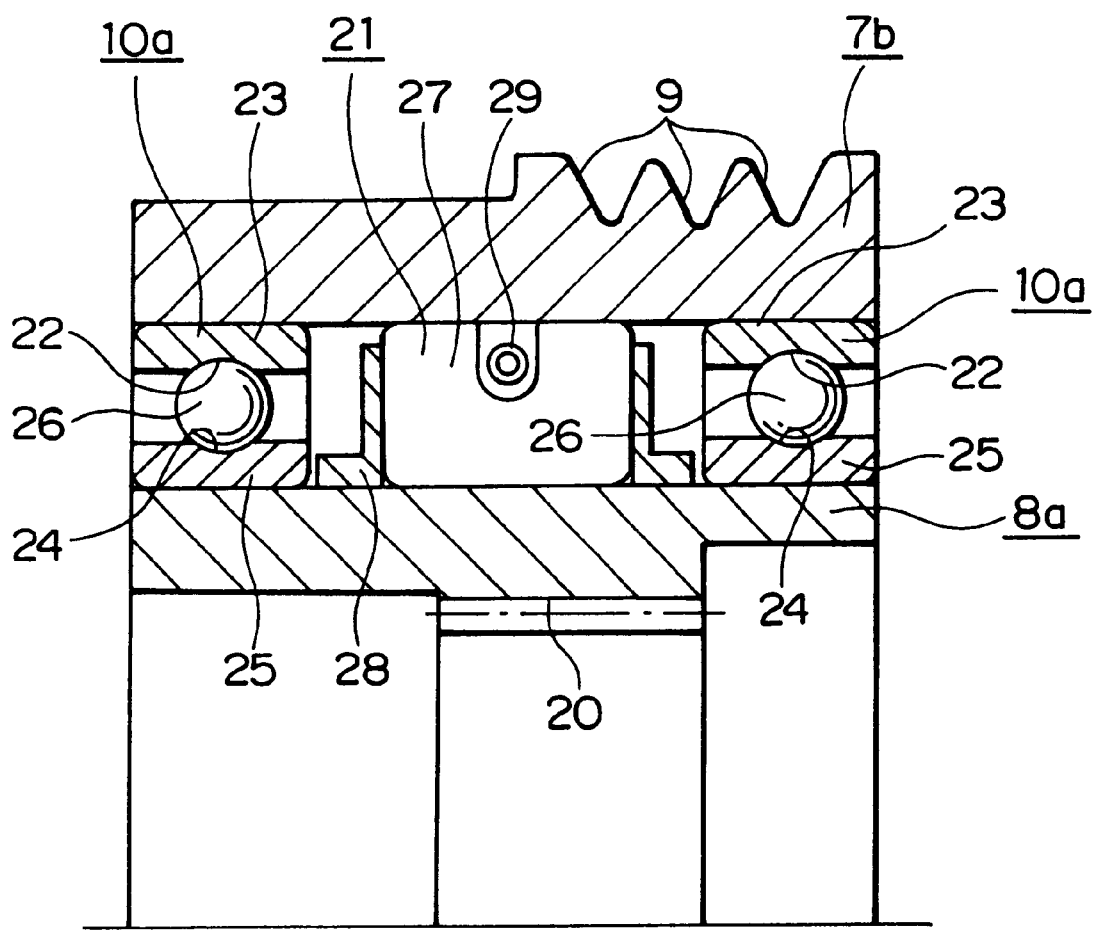
FIG. 6 is a cross sectional view of a half part for showing the first embodiment of the present invention.
Figure 8:
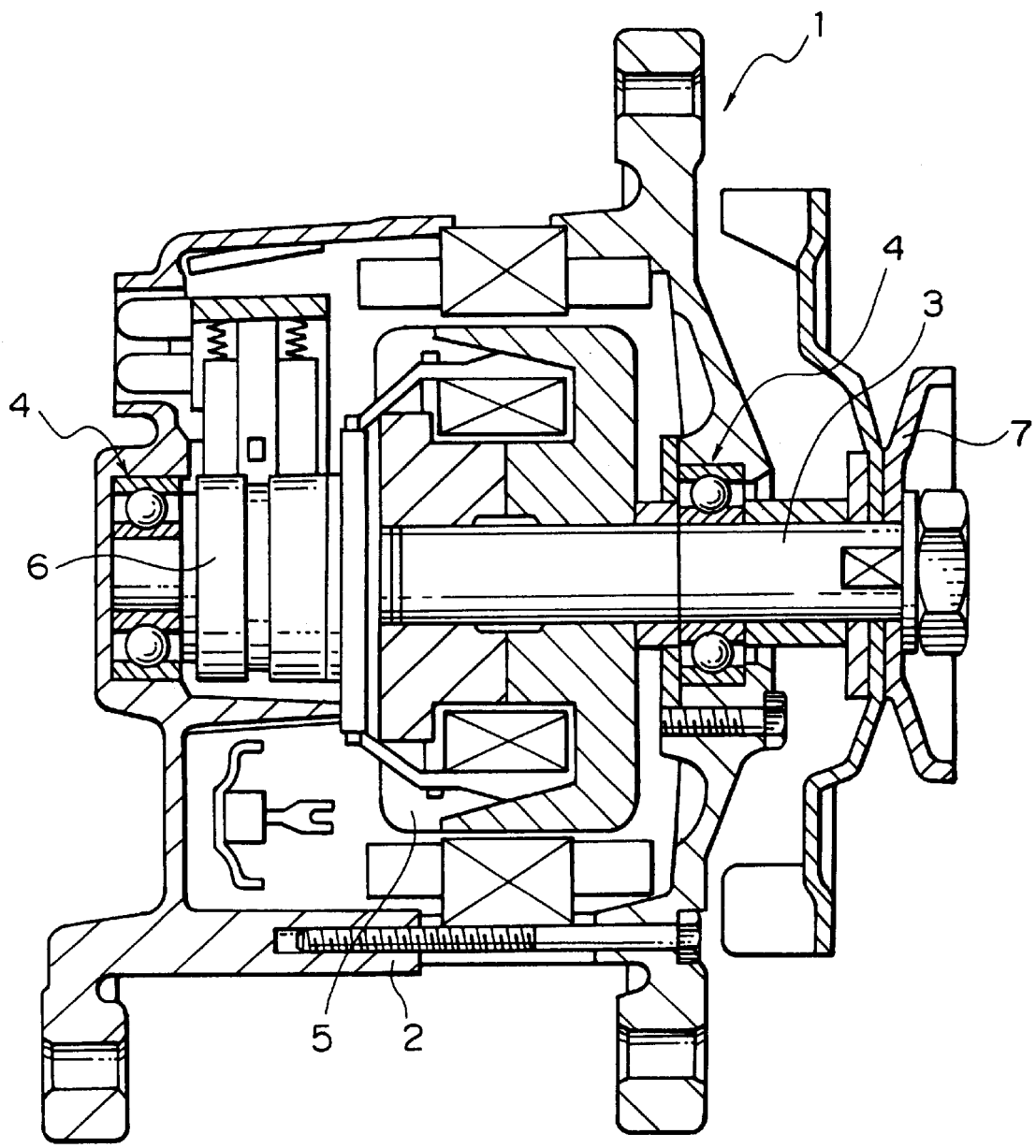
FIG. 8 is a cross sectional view for showing a conventionally known alternator.
Figure 9:
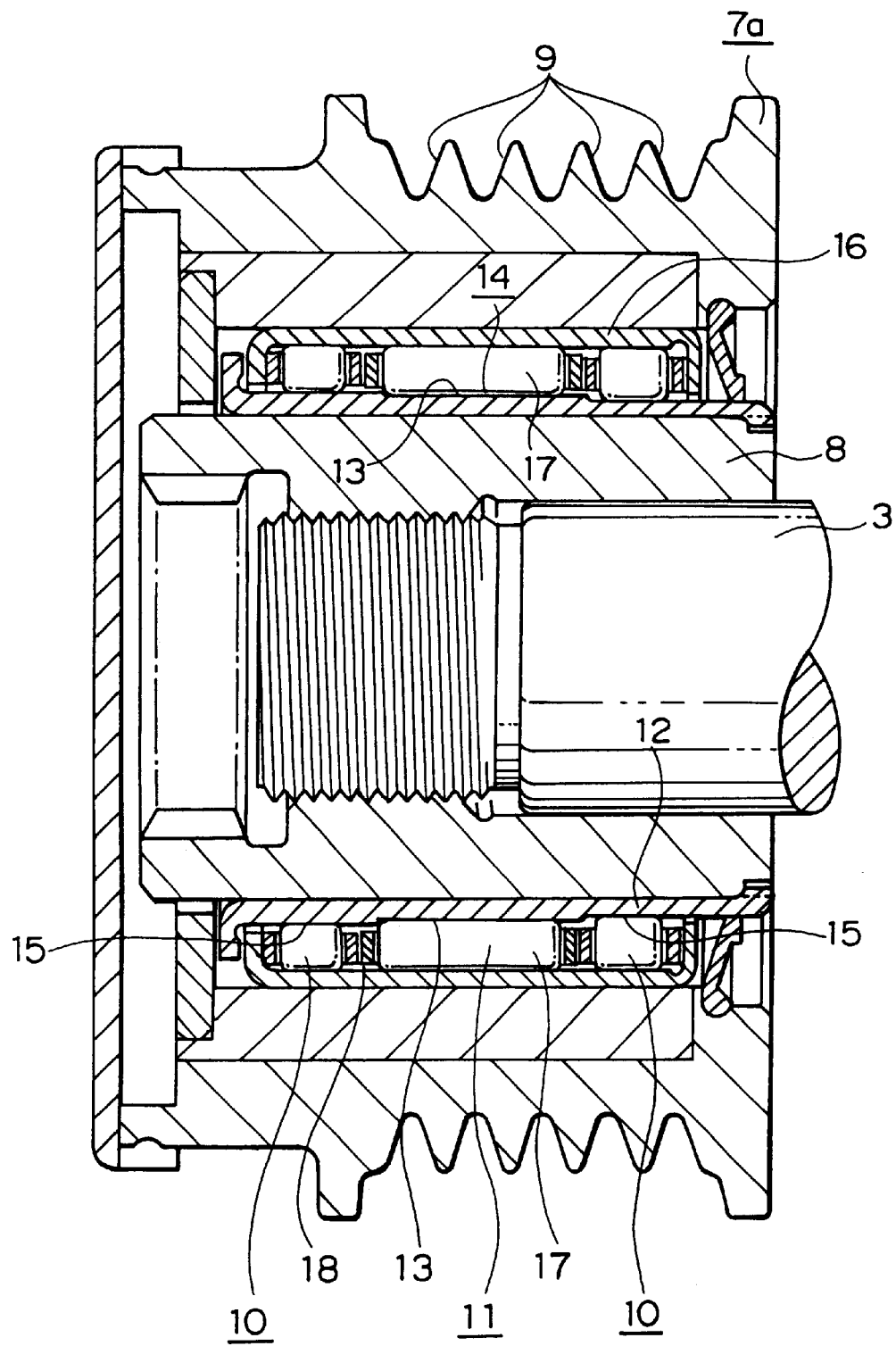
FIG. 9 is a cross sectional view for showing another one-way clutch built-in type pulley apparatus for an alternator conventionally known.

FIG. 6 shows a first embodiment of the present invention, in which a sleeve 8a is formed to be cylindrical as a whole and is fitted on and fixed to an end portion of the rotary shaft 3 of the alternator (see FIGS. 8 and 9), to be rotatable together with this rotary shaft 3. To this end, in the illustrated structure, a female spline portion 20 is formed on the inner peripheral surface of a middle part of the sleeve 8a, and this female spline portion 20 and a male spline portion (omitted in the drawing) formed on the outer peripheral surface of an end portion of the rotary shaft 3 are arranged to be engaged with each other. Note that the arrangement for preventing a relative rotation between the rotary shaft 3 and the sleeve 8a may be a fitting by a screw as shown in FIG. 9 above, instead of the splines, or between the non-cylindrical surfaces, or a key engagement, or the like.

Around the sleeve 8a as mentioned above, there is provided a driven pulley 7b concentrically with this sleeve 8a. This driven pulley 7b is provided with support bearings 10a, 10a and a one-way clutch 21 of a sprag type, which will be described later, on the inner side thereof. On the outer peripheral surface of the driven pulley 7b, there are formed a plurality of grooves 9, 9 each having a V-shaped cross section and extending along the entire circumference in parallel to each other. An endless belt which is provided with a plurality of ribs each having a V-shaped cross section and extending along the entire circumference on the inner peripheral surface thereof is bridged from such driven pulley 7b to an unrepresented driving pulley.

Between the outer peripheral surface of the sleeve 8a which is constituted as mentioned above and the inner peripheral surface of the driven pulley 7b which is also constituted as mentioned above, there are provided a pair of support bearings 10a, 10a and a single one-way clutch 21. Out of them, the support bearings 10a, 10a are arranged to allow a relative rotation between the sleeve 8a and the driven pulley 7b, while supporting a radial load which is applied on the driven pulley 7b. In the illustrated structure, deep groove ball bearings are employed as the support bearings 10a, 10a. More specifically, each of these support bearings 10a, 10a is constituted by an outer race 23 having an outer race-way 22 of deep groove type on the inner peripheral surface thereof, an inner race 25 having an inner race-way 24 of deep groove type on the outer peripheral surface thereof, and a plurality of rolling members (balls) 26, 26 rotatably provided between the outer race-way 22 and the inner race-way 24. These support bearings 10a, 10a are provided between the both end portions on the outer peripheral surface of the sleeve 8a and the both end portions on the inner peripheral surface of the driven pulley 7b by interference-fitting and fixing the outer races 23, 23 thereof in and to the both end portions on the inner peripheral surface of the driven pulley 7b, and interference-fitting and fixing the inner races 25, 25 thereof on and to the both end portions on the outer peripheral surface of the sleeve 8a.

Also, the one-way clutch 21 allows transmission of a rotating force between the driven pulley 7b and the sleeve 8a only when the driven pulley 7b is inclined to rotate in a given direction with respect to the sleeve 8a. In order to constitute such one-way clutch 21, in case of the present embodiment, the pulley 7b and the sleeve 8a are formed of hard metal such as bearing steel, and the inner peripheral surface of a middle part of the pulley 7b and the outer peripheral surface of a middle part of the sleeve 8a are formed to be cylindrical, respectively. Then, between these both peripheral surfaces, a plurality of sprags 27 each having a non-circular cross section are provided as being retained by a clutch retainer 28 to serve as lock members, respectively. In case of the present embodiment, the both end portions of this clutch retainer 28 in the axial direction are brought into contact with, or into the approximation to, the end surfaces of the inner races 25, 25 for constituting the support bearings 10a, 10a, so as to prevent displacement in the axial direction.

The plurality of sprags 27 for constituting the one-way clutch 21 as mentioned above are given by an elastic member such as an elastic ring 29 a biasing force in a direction to be pressed upon the inner peripheral surface of the pulley 7b and the outer peripheral surface of the sleeve 8a. When the sleeve 8a and the driven pulley 7b are rotated relatively to each other in a given direction, each of the sprags 27 is held in engagement between the outer peripheral surface of the sleeve 8a and the inner peripheral surface of the driven pulley 7b so as to transmit a rotating force between the sleeve 8a and the driven pulley 7b. On the other hand, when the sleeve 8a and the driven pulley 7b are rotated relatively to each other in reverse directions, each of the sprags 27 slides on the outer peripheral surface of the sleeve 8a and the inner peripheral surface of the driven pulley 7b not to allow transmission of a rotating force between the sleeve 8a and the driven pulley 7b. Note that the structure and the function of such one-way clutch 21 of a sprag type are conventionally known so that detailed description thereof will be omitted. Also, a variety of shapes can be employed as the shape of the sprag 27, depending on the magnitude of a torque to be transmitted.

The one-way clutch built-in type driven pulley apparatus for an alternator of the present embodiment constituted as described above is employed, for example, in a case in which the tractive force per unit length for each of the ribs formed on the inner peripheral surface of the endless belt to be engaged with the grooves 9, 9, respectively, exceeds 100 [kgf/m] and a rate of fluctuation in speed of rotation of the driving engine is about 20% at its idling time. Also, the decline in angular velocity of the rotary shaft 3 when the one-way clutch 21 is in an overrun state is suppressed to the minimum by setting restriction to the relation between the inertial moment of the rotary shaft 3 of the alternator and the resistance against the rotation of this rotary shaft 3. Then, the fluctuation range of the angular velocity of the rotary shaft when an engine serving as the driving source of the alternator is in an idling state and the electric current load of this alternator is at its maximum is set to be less than a half (preferably a third, and more preferably a fourth) of that of the driven pulley 7b. If the above-mentioned one-way clutch built-in type pulley apparatus for an alternator is employed in the above-mentioned case under such condition so as to drive and rotate the alternator, the torque is transmitted from the driven pulley 7 to this rotary shaft 3 by the action of the one-way clutch 21 only when the speed of rotation of the driven pulley 7b around which the endless belt is wrapped is not less than the speed of rotation of the sleeve 8a which is fixed to the rotary shaft 3 of the alternator.

Conversely, when the speed of rotation of the driven pulley 7b is less than the speed of rotation of the sleeve 8a, connection between the driven pulley 7b and the sleeve 8a is intercepted so as to allow this sleeve 8a to rotate at a higher speed than this driven pulley 7b. For this reason, if the speed of rotation of this driven pulley 7b on which the endless belt is wrapped rises the next moment, a difference between the speed of rotation of this driven pulley 7b and the speed of rotation of a portion which rotates integrally with the sleeve 8a becomes small, which results in reduction of the inertial load of a portion which is driven to rotate together with the driven pulley 7a. Especially, since the fluctuation range of the angular velocity of the rotary shaft 3 is set to be less than a half of that of the driven pulley 7b, the maximum value for a torque, out of the torque for driving this rotary shaft 3, owing to the inertial moment with respect to this rotary shaft 3 is reduced to the minimum so as to prevent generation of squeal similarly to the above-mentioned case in which the tractive force T for each of the ribs formed on the inner peripheral surface of the endless belt is reduced.

Figure 7:
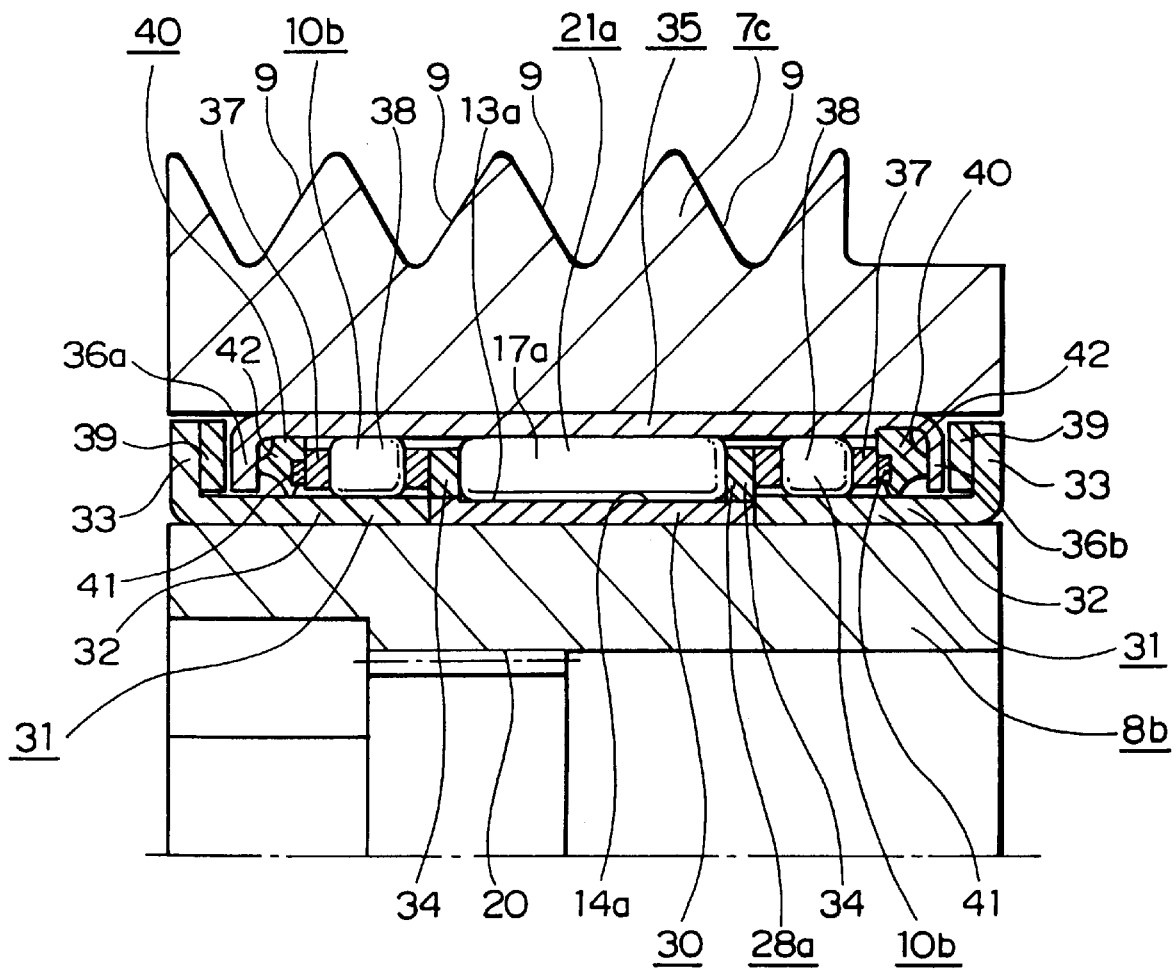
FIG. 7 is a cross sectional view of a half part for showing the second embodiment of the present invention.

Next, FIG. 7 shows a second embodiment of the present invention. In case of the second embodiment, there are provided a pair of support bearings 10b, 10b respectively serving as radial roller bearings and a one-way clutch 21a serving as a roller clutch between the outer peripheral surface of a sleeve 8b and the inner peripheral surface of a driven pulley 7c. For constituting the one-way clutch 21a, out of these components, a one-way clutch inner race 30 is interference-fitted on and fixed to the outer peripheral surface of the middle part of the sleeve 8b. This one-way clutch inner race 30 is formed of a plate member of hard metal such as bearing steel or a plate member of carburizing steel such as Japanese Industrial Standard SCM415 to be cylindrical as a whole, and have the outer peripheral surface as a cam surf ace 14a. Also, for constituting the support bearings 10b, 10b, inner races 31, 31 are interference-fitted on and fixed to the outer peripheral surfaces of the both end portions of the sleeve 8b, respectively. Each of these inner races 31, 31 which is also formed of a plate member of hard metal such as bearing steel or a plate member of carburizing steel such as JIS SCM415 is formed to be cylindrical as a whole with an L-shaped cross section, by forming an outward flange 33 on the inner race side at one edge of a cylindrical portion 32.

Such inner races 31, 31 are fitted on the sleeve 8b in a state in which the inner race side flanges 33 are positioned opposite to each other, whereby the respective leading edges thereof opposite to the side flanges are caused to abut upon the both edges of the one-way clutch inner race 30 in the axial direction. In case of the second embodiment, the outer diameter of the cylindrical portion 32 of each of the inner races 31, 31 is set to be larger than the diameter of an inscribed circle related to the bottom portion of a plurality of recesses 13a which are formed on the outer peripheral surface of the one-way clutch inner race 30. Then, one side in the axial direction of each of protruding pieces 34, 34 which is formed on the inner peripheral surface of the clutch retainer 28a for constituting the one-way clutch 21a to be engaged with each of the recesses 13a is disposed to be opposite to the edge of each of the inner races 31, 31, thereby preventing displacement of the clutch retainer 28a in the axial direction.

On the other hand, an outer race 35 is interference-fitted in and fixed to the driven pulley 7c. This outer race 35 functions not only as an outer race of the one-way clutch 21a, but also as an outer race of each of the support bearings 10b, 10b, and is also formed to be cylindrical as a whole of a plate member of hard metal such as bearing steel or a plate member of carburizing steel such as JIS SCM41 by pressing. Inward flanges 36a, 36b on the outer race side are formed at the both edges of such outer race 35 in the axial direction. Note that since one 36a (the left one in FIG. 7) of these outer race side flanges 36a, 36b is formed before it is combined with any of other constituent parts, this flange has the same thickness as that of the main part of the outer race 35. On the other hand, the other outer race flange 36b (the right one in FIG. 7) is formed to be thinner since it is formed after being combined with other constituent parts.

Then, the one-way clutch 21a is constituted to contain the inner peripheral surface of the middle part of the outer race 35 and the outer peripheral surface of the one-way clutch inner race 30. More specifically, the clutch retainer 28a in the form of a ladder type cylinder of synthetic resin, a plurality of rollers 17a in a unit, and an unrepresented spring are provided between the inner peripheral surface of the middle part of the outer race 35 and the outer peripheral surface of the one-way clutch outer race 30. Also, as stated above, the clutch retainer 28a has the protruding pieces 34, 34 formed on the inner peripheral surface thereof to be engaged with the recesses 13a for forming the cam surface 14a of the one-way clutch inner race 30, thereby preventing a relative rotation with respect to the one-way clutch inner race 30.

The support bearings 10b, 10b are formed to include the inner races 31, 31 and parts near the both end portions in the axial direction of the outer race 35. More specifically, between the outer peripheral surfaces of the inner races 31, 31 and the inner peripheral surfaces of the parts near the both end portions in the axial direction of the outer race 35, there are arranged bearing retainers 37, 37 in the form of ladder type cylinders of synthetic resin and a plurality of rollers 38, 38 which are rotatably retained by these bearing retainers 37, 37, respectively, so as to constitute a radial roller bearing.

Moreover, between the outer side surfaces of the outer race side flanges 36a, 36b and the inner side surfaces of the inner race side flanges 33, 33, floating washers 39, 39 are provided to be capable of relative rotation with respect to the outer race side flanges 36a, 36b and the inner race side flanges 33, 33, respectively. Each of the floating washers 39, 39 is formed to be annular, of self-lubricating metal such as copper, metal subjected to a tuff triding treatment, metallic material impregnated with lubricating oil such as oil retaining metal, or synthetic resin having a low coefficient of friction such as polyamide resin, polyacetal resin, or polytetrafluoro-ethylene resin. Such floating washers 39, 39 are loosely sandwiched by and between the outer race side flanges 36a, 36b and the inner race side flanges 33, 33. The floating washers 39, 39 are guided by the outer peripheral surfaces of the inner races 31, 31 or the inner peripheral surface of the driven pulley 7c (to prevent displacement thereof in the radial direction).

Gaps between the inner peripheral surfaces of the end portions in the axial direction of the outer race 35 and the outer peripheral surfaces of the inner races 31, 31 are sealed by seal rings 40, 40, respectively. Each of these seal rings 40, 40 is constituted by a core metal 41 and an elastic member 42, and the elastic member 42 is fitted in and supported by the inner peripheral surfaces of the both end portions of the outer race 35 with the diameter thereof elastically contracted. Then, the leading edges of a plurality of seal lips which are respectively provided for each of the elastic members 42, 42 are brought into contact or sliding contact with the outer peripheral surfaces of the middle parts of the inner races 31, 31 and the inner side surfaces of the outer race side flanges 36a, 36b. It is arranged such that portions of one sides of the core metals 41, 41 of the respective seal rings 40, 40 opposite to end surfaces of the bearing retainers 37, 37 for constituting the support bearings 10b, 10b are not covered with the elastic members 42, 42 so that, even if the end surfaces of the bearing retainers 37, 37 and the side surfaces of the core metals 41, 41 are brought into sliding contact with each other, a sliding resistance can be reduced to the minimum.

The structure of the second embodiment described above is also employed in the case in which the tractive force per unit length for each of the ribs formed on the inner peripheral surface of the endless belt, which is determined by the number of the grooves 9, 9 (four in this embodiment) formed on the outer peripheral surface of the driven pulley 7c, exceeds 100 [kgf/m]. Also, a decline in the angular velocity of the rotary shaft when the one-way clutch 21a is in an overrun state is reduced to the minimum when the one-way clutch 21a is in an overrun state by setting restriction to the relation between the inertial moment of the rotary shaft of the alternator and the resistance with respect to the rotation of this rotary shaft. Then, the fluctuation range of the angular velocity per rotation of the rotary shaft when the engine serving as the driving source of the alternator is in an idling state and the electric current load of this alternator is at its maximum is set to be less than a half (preferably a third, and more preferably a fourth) of the fluctuation range of the angular velocity per rotation of the driven pulley 7c. Also in the present embodiment with such structure, it is possible to prevent generation of an annoying squeal.

Since the one-way clutch built-in type pulley apparatus for an alternator and a method for preventing squeal of an endless belt for driving an alternator according to the present invention are constituted and operated as stated above, it is possible to suppress the noise called squeal to prevent discomfort feelings from being given to the persons around the car including the driver, even if the running speed of the endless belt for driving the alternator largely fluctuates when a diesel engine is in an idling state, or the like.

What is claimed is:

1. A one-way clutch built-in type driven pulley apparatus for an alternator comprising:

a rotary shaft for driving an alternator to rotate with a rotor of this alternator;

a driven pulley disposed around the rotary shaft concentrically with the rotary shaft;

a one-way clutch disposed between a middle part in the axial direction of the outer peripheral surface of the rotary shaft and a middle part in the axial direction of the inner peripheral surface of the driven pulley to transmit a rotating force between the driven pulley and the rotary shaft only when this driven pulley is caused to relatively rotate in a given direction with respect to said rotary shaft; and a pair of support bearings disposed between the outer peripheral surface of said rotary shaft and the inner peripheral surface of the driven pulley to sandwich the one-way clutch therebetween from the both sides in the axial direction to allow a relative rotation between the rotary shaft and the driven pulley while pivotally supporting a radial load applied on the driven pulley, said driven pulley apparatus being used in a state in which an endless belt is passed over from the outer peripheral surface of the driven pulley to a driving pulley fixed to an end portion of a crank shaft of an engine, wherein the range of fluctuation in angular velocity of rotation per rotation of said rotary shaft is less than one-half the range of fluctuation in angular velocity of rotation per rotation of said driven pulley in order to reduce a driving torque of the alternator when said engine is in an idling state and an electric current load of said alternator is at its maximum.

2. A method for preventing squeal of an endless belt for driving an alternator using a one-way clutch built-in type pulley apparatus which comprises:

a driven pulley concentrically disposed around a rotary shaft for driving the rotary shaft of the alternator by use of an endless belt wrapped around a driving pulley fixed to an end portion of a crank shaft of an engine;

a one-way clutch disposed between a middle part in the axial direction of the outer peripheral surface of the rotary shaft and a middle part in the axial direction of the inner peripheral surface of the driven pulley to transmit a rotating force between the driven pulley and the rotary shaft only when this driven pulley is caused to relatively rotate in a given direction with respect to said rotary shaft; and a pair of support bearings disposed between the outer peripheral surface of said rotary shaft and the inner peripheral surface of the driven pulley to sandwich the one-way clutch therebetween from both sides in the axial direction to allow a relative rotation between the rotary shaft and the driven pulley while pivotally supporting a radial load applied on the driven pulley, wherein the range of fluctuation in angular velocity of rotation per rotation of said rotary shaft is less than one-half the range of fluctuation in angular velocity of rotation per rotation of said driven pulley when said engine is in an idling state and an electric current load of said alternator is at its maximum.

* * * * *